(12) United States Patent
Shibata et al.

(10) Patent No.: US 7,712,979 B2
(45) Date of Patent: May 11, 2010

(54) OPTICAL ADAPTER

(75) Inventors: Masahiro Shibata, Chigasaki (JP); Masakazu Shigehara, Chigasaki (JP)

(73) Assignee: Sumiden High Precision Co., Ltd., Kanagawa (JP)

( * ) Notice: Subject to any disclaimer, the term of this patent is extended or adjusted under 35 U.S.C. 154(b) by 0 days.

(21) Appl. No.: 12/000,667

(22) Filed: Dec. 14, 2007

(65) Prior Publication Data

US 2008/0310800 A1    Dec. 18, 2008

Related U.S. Application Data

(60) Provisional application No. 60/877,003, filed on Dec. 26, 2006.

(30) Foreign Application Priority Data

Dec. 15, 2006 (JP) .............................. 2006-338910

(51) Int. Cl.
G02B 6/36 (2006.01)
(52) U.S. Cl. .......................................... 385/92; 385/78
(58) Field of Classification Search ................... 385/53, 385/58, 88, 89
See application file for complete search history.

(56) References Cited

U.S. PATENT DOCUMENTS

| | | | |
|---|---|---|---|
| 4,953,929 A | 9/1990 | Basista et al. | |
| 5,123,071 A | 6/1992 | Mulholland et al. | |
| 5,268,982 A | 12/1993 | Schaffer et al. | |
| 5,293,581 A | 3/1994 | DiMarco | |
| 5,315,679 A | 5/1994 | Baldwin et al. | |
| 5,325,454 A | 6/1994 | Rittle et al. | |
| 5,337,396 A | 8/1994 | Chen et al. | |
| 5,343,547 A | 8/1994 | Palecek et al. | |
| 5,398,295 A | 3/1995 | Chang et al. | |
| 5,452,388 A | 9/1995 | Rittle et al. | |
| 5,475,781 A | 12/1995 | Change et al. | |
| 5,509,093 A | 4/1996 | Miller et al. | |

(Continued)

FOREIGN PATENT DOCUMENTS

JP    2004-212709    7/2004

(Continued)

OTHER PUBLICATIONS

United States Office Action issued in U.S. Appl. No. 11/494,728, mailed Nov. 29, 2007.

(Continued)

*Primary Examiner*—Frank G Font
*Assistant Examiner*—Peter Radkowski
(74) *Attorney, Agent, or Firm*—McDermott Will & Emery LLP

(57) ABSTRACT

The present invention provides an optical adapter, which can suppress electromagnetic waves from an optical communication module, is provided. An optical adapter comprises: a housing; an optical fiber which is housed in the housing; and a ferrule which is housed in the housing. The housing has a first edge to be inserted into a receptacle of an optical communication module, and a second edge for insertion of an optical connector plug. The optical fiber has a first edge to optically couple with the receptacle, and a second edge to optically couple with the optical connector plug. The ferrule houses the optical fiber. At least a part of the housing or at least part of the ferrule is formed of an electromagnetic absorption material.

4 Claims, 2 Drawing Sheets

U.S. PATENT DOCUMENTS

| | | | |
|---|---|---|---|
| 5,553,180 A | 9/1996 | Belenkiy et al. | |
| 5,574,812 A | 11/1996 | Beier et al. | |
| 5,598,495 A | 1/1997 | Rittle et al. | |
| 5,608,830 A | 3/1997 | Belenkiy et al. | |
| 5,613,025 A | 3/1997 | Grois et al. | |
| 5,675,682 A | 10/1997 | De Marchi | |
| 5,748,821 A | 5/1998 | Schempp et al. | |
| 5,993,073 A * | 11/1999 | Hamakawa et al. | 385/88 |
| 6,000,856 A | 12/1999 | Yunker | |
| 6,059,461 A | 5/2000 | Aoki et al. | |
| 6,212,324 B1 | 4/2001 | Lin et al. | |
| 6,250,817 B1 | 6/2001 | Lampert et al. | |
| 6,409,392 B1 | 6/2002 | Lampert et al. | |
| 6,415,078 B1 * | 7/2002 | Shigehara et al. | 385/37 |
| 6,419,810 B1 * | 7/2002 | Tanaka et al. | 205/73 |
| 6,447,173 B1 * | 9/2002 | Takada et al. | 385/78 |
| 6,588,939 B2 | 7/2003 | Lee | |
| 6,669,376 B2 | 12/2003 | Cheng | |
| 6,672,898 B2 | 1/2004 | Kahle et al. | |
| 6,707,979 B2 | 3/2004 | Wang et al. | |
| 6,709,167 B2 | 3/2004 | Ishibashi et al. | |
| 6,761,488 B2 | 7/2004 | Weigel | |
| 6,851,869 B2 | 2/2005 | Miller et al. | |
| 6,857,791 B2 | 2/2005 | Fischer et al. | |
| 6,948,233 B2 * | 9/2005 | Mukouda | 29/747 |
| 6,994,477 B2 * | 2/2006 | Takada et al. | 385/78 |
| 7,083,332 B2 * | 8/2006 | Mukouda | 385/71 |
| 7,186,037 B2 | 3/2007 | Yuuki | |
| 7,317,677 B2 * | 1/2008 | Atarashi | 369/120 |
| 2002/0146214 A1 * | 10/2002 | Tanaka et al. | 385/78 |
| 2003/0190498 A1 | 10/2003 | Fujieda et al. | |
| 2004/0197055 A1 | 10/2004 | Fischer et al. | |
| 2005/0025431 A1 * | 2/2005 | Takada et al. | 385/60 |
| 2005/0113873 A1 * | 5/2005 | Weiner et al. | 607/2 |
| 2005/0113874 A1 * | 5/2005 | Connelly et al. | 607/2 |
| 2005/0254759 A1 | 11/2005 | O'Brien | |

OTHER PUBLICATIONS

Cuming Microwave Corporation, "Technical Bulletin 330-4", Nov. 26, 1996.

U.S. Office Action issued in U.S. Appl. No. 11/494,728 dated Feb. 26, 2007.

* cited by examiner

OPTICAL ADAPTER

CROSS REFERENCE TO RELATED APPLICATIONS

This application is based upon and claims the benefit of priorities from the prior Japanese Patent Application No. 2006-338910, filed on Dec. 15, 2006 and provisional U.S. application No. 60/877,003, filed on Dec. 26, 2006, the entire contents of which are incorporated herein by reference.

BACKGROUND OF THE INVENTION

1. Field of the Invention

The present invention relates to an optical adapter.

2. Background Art

An optical communication module comprises an optical transmission subassembly, optical receive subassembly, circuit board, receptacle and a casing. The optical transmission subassembly has a light emitting element which generates light, and the optical receive subassembly has a light receiving element for receiving light. The circuit board, on which a driver IC and other elements are mounted, is electrically connected with the light emitting element and light receiving element. The casing is formed so as to cover the optical transmission subassembly, optical receive subassembly and circuit board. The receptacle has opening sections for optically coupling an optical fiber to the light emitting element and light receiving element respectively. An optical connector plug holding an optical fiber is inserted into the opening section of the receptacle. For such an optical communication module, a metal casing is used to prevent the emission of electromagnetic waves to the outside. This technology is disclosed, for example, in Japanese Patent Application Laid-Open No. 2004-212709.

In the above mentioned optical communication module, however, electromagnetic waves are emitted to the outside from the opening sections of the receptacle. Also in a state where the optical connector plug is being inserted into the receptacle, weak electromagnetic waves from inside the optical communication module may be induced and emitted by a metal component inside the optical connector plug.

SUMMARY OF THE INVENTION

With the foregoing in view, it is an object of the present invention to provide an optical adapter which can suppress electromagnetic waves from the optical communication module.

The optical adapter of the present invention comprises: a housing, having a first edge to be inserted into a receptacle of an optical communication module, and a second edge for insertion of an optical connector plug; an optical fiber which is housed in the housing, further comprising a first edge to optically couple with the receptacle and a second edge to optically couple the optical connector plug; and a ferrule which is housed in the housing for housing the optical fiber, wherein at least a part of the housing or at least a part of the ferrule is formed of electromagnetic wave absorption material.

According to the optical adapter of the present invention, when the first edge of the housing is inserted into the receptacle, electromagnetic waves emitted from the opening section of the receptacle are absorbed by the housing of the optical adapter or the ferrule. Therefore the electromagnetic waves from the optical communication module can be suppressed. Since electromagnetic waves emitted from the optical communication module are absorbed by the optical adapter, the induced emission of electromagnetic waves can be suppressed even if a metal component is included inside the optical connector plug.

It is preferable that the electromagnetic wave absorption material absorbs electromagnetic waves of which frequency is 1 GHz or more and 50 GHz or less. In this case, radiating noise from the optical communication module can be effectively suppressed.

It is also preferable that the electromagnetic wave absorption material is formed of resin containing an additive which has electromagnetic wave absorbing properties. In this case, the housing or the ferrule that has an electromagnetic wave absorption function can be provided at low cost by adding an additive to resin which can be easily processed.

It is preferable that the additive is a fine powder of iron, iron oxide, carbon or stainless. It is also preferable that the additive is a fine powder comprising two or more materials from among iron, aluminum, cobalt and silicon. The additive may be a fine powder of aluminum, cobalt or silicon.

It is also preferable that the resin is polyamide resin, PBT resin, PPS resin, LCP resin or PEEK resin. In this case, the housing or the ferrule having the electromagnetic wave absorption function can be provided at low cost by injection molding.

DETAILED DESCRIPTION

The embodiment of the present invention will now be described with reference to the accompanying drawings. In the description of the drawings, the same or equivalent elements are denoted with the same reference symbol, for which redundant description is omitted.

Figure 1:
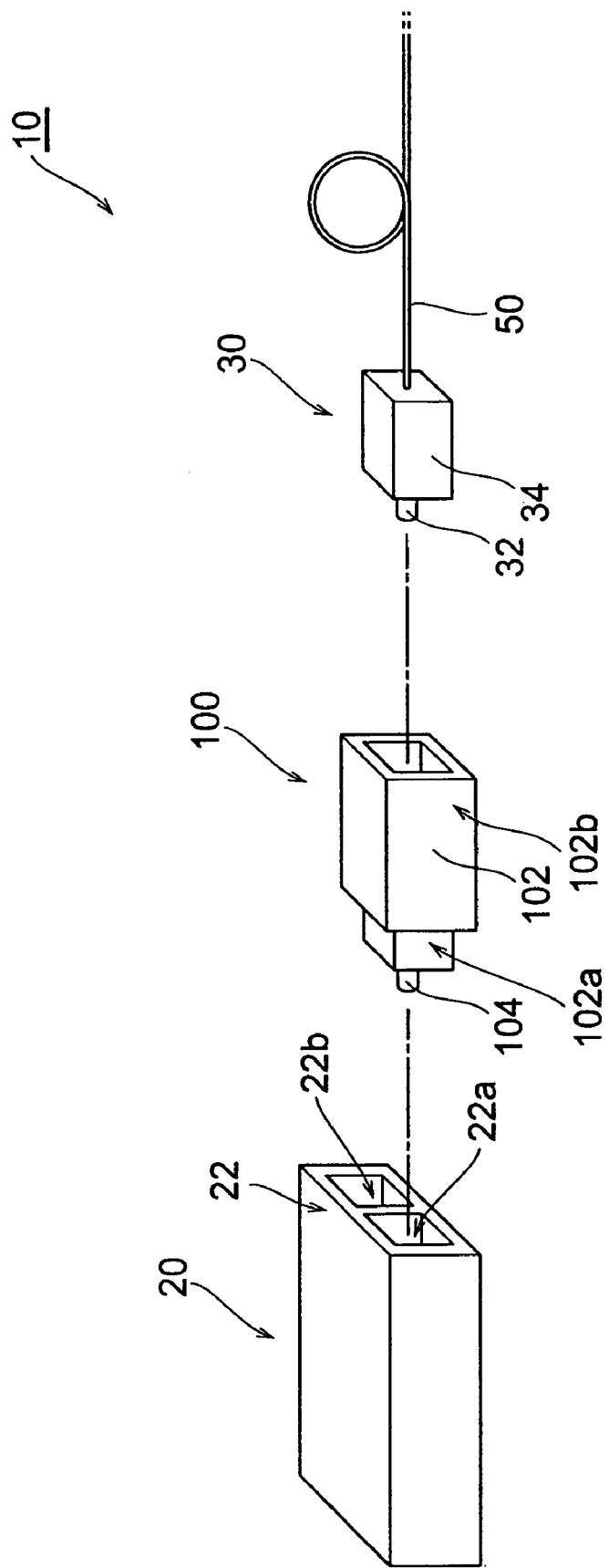
FIG. 1 is a perspective view depicting an optical communication device comprising an optical adapter according to the present embodiment.

FIG. 1 is a perspective view depicting an optical communication device comprising an optical adapter according to the present embodiment. The optical communication device 10 shown in FIG. 1 comprises an optical communication module 20, an optical connector plug 30 and an optical adapter 100 which optically couples the optical communication module 20 and the optical connector plug 30. For the optical communication module 20, an optical transceiver, for example, can be used. The optical adapter 100 is a plug/jack type, for example.

The optical connector plug 30 transmits an optical signal from the optical communication module 20, or transmits an optical signal from the outside to the optical communication module 20. The optical connector plug 30 may be any one of an SC type optical connector plug, MU type optical connector plug and LC type optical connector plug. The optical connector plug 30 comprises a casing 34, a ferrule 32 housed in the casing 34, and an optical fiber housed in the ferrule. The ferrule 32 protrudes from the casing 34 toward the optical communication module 20 side. A cable 50, which is optically coupled with the optical fiber, is connected to the casing 34.

The optical communication module 20 comprises an optical transmission subassembly, an optical receive subassembly and a receptacle 22. The optical transmission subassembly is a device for outputting an optical signal, and has such a light emitting element as a semiconductor laser. The optical receive subassembly is a device for receiving an optical signal, and has such a light receiving element as a photodiode.

The optical communication module 20 further comprises a circuit board on which such an element as a driver IC for driving the light emitting element is mounted. This circuit board is electrically connected to the optical transmission subassembly and optical receive subassembly. Therefore the optical communication module 20 generates electromagnetic waves from the elements and wires therein. The optical communication module 20 uses a metal material which blocks electromagnetic waves for the casing constituting the external framework in order to decrease the emission of electromagnetic waves to the outside.

The receptacle 22 has two opening sections: 22a and 22b. In the two opening section 22a and 22b, the optical transmission subassembly and optical receive subassembly are housed respectively. In the opening section 22a, 22b of the receptacle 22, the optical adapter 100 is inserted. By this, the optical fiber of the optical adapter 100 is optically coupled with the light emitting element of the optical transmission subassembly or the light receiving element of the optical receive subassembly. The optical adapter 100, according to the present embodiment, will now be described.

Figure 2:
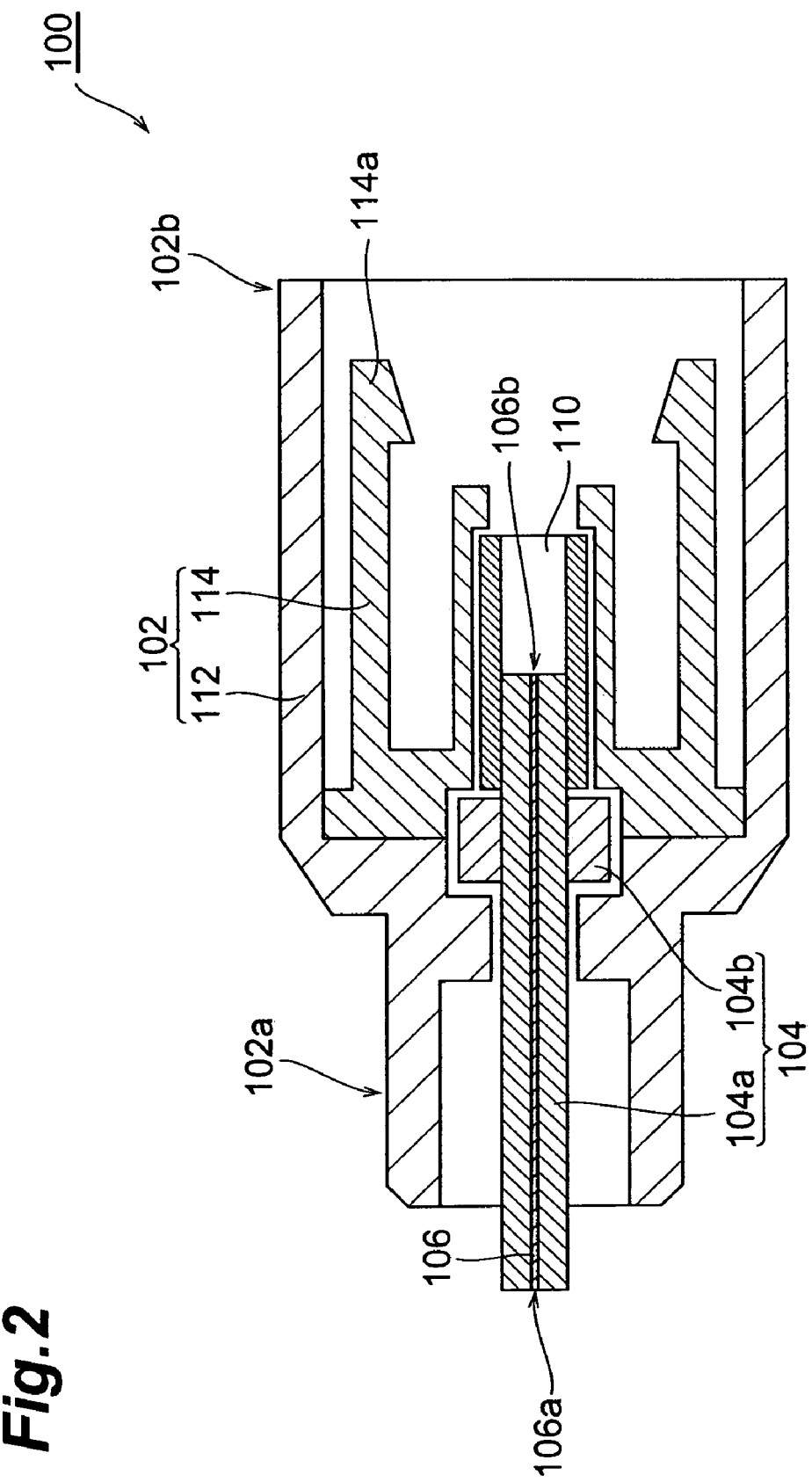
FIG. 2 is a longitudinal cross-sectional view depicting the optical adapter according to the present embodiment.

FIG. 2 is a longitudinal cross-sectional view depicting the optical adapter according to the present embodiment. As FIG. 2 shows, the optical adapter 100 comprises a housing 102, a ferrule 104 which is housed in the housing 102, and an optical fiber 106 which is housed inside the ferrule 104. The housing 102 covers the optical fiber 106 and the ferrule 104.

The housing 102 has a first edge 102a to be inserted into the receptacle 22 of the optical communication module 20, and a second edge 102b for insertion of the optical connector plug 30. The housing 102 has a convex portion 112 which includes the first edge 102a, and a concave portion 114 which includes the second edge 102b. The convex portion 112 protrudes toward the optical communication module 20 side. The concave portion 114 has a recess toward the optical communication module 20 side. The convex portion 112 and the concave portion 114 may be integrated. The concave portion 114 has a latch 114a for holding the optical connector plug 30.

The optical fiber 106 has a first edge 106a which optically couples with the receptacle 22, and a second edge 106b which optically couples with the optical connector plug 30. The surface of the optical fiber 106 may be coated. At the second edge 106b of the optical fiber 106, a sleeve 110 which covers the edge 106b and the edge of the ferrule core 104a, and which protrudes toward the optical connector plug 30 side, is formed. The sleeve 110 is roughly a cylindrical element.

A ferrule 104 houses and holds the optical fiber 106. The ferrule 104 has a ferrule core 104a and a flange 104b. The ferrule core 104a is roughly a cylindrical element. The optical fiber 106 is inserted into the inner hole of the ferrule core 104a. The ferrule core 104a of the present embodiment is formed of Ni. The ferrule core 104a may be formed of ceramic, such as zirconia.

The flange 104b has roughly a cylindrical shape. The flange 104b is an element formed of metal or resin, but is preferably an element formed of resin having an electromagnetic wave absorption function. The flange 104b is formed on the same axis as the ferrule core 104a. The ferrule core 104a passes through the inner hole of the flange 104b, and extends from the opening at the other end of the flange 104b.

In the present embodiment, at least a part of the housing 102 or at least a part of the ferrule 104 is formed of an electromagnetic wave absorption material. For example, a part or all of the housing 102 may be formed of an electromagnetic wave absorption material, or a part or all of the ferrule 104 may be formed of an electromagnetic wave absorption material. Therefore at least one of the convex portion 112 and concave portion 114 may be formed of an electromagnetic wave absorption material, or at least one of the ferrule core 104a and flange 104b may be formed of an electromagnetic wave absorption material. It is preferable that the convex portion 112, concave portion 114 and flange 104b are formed of an electromagnetic wave absorption material. The volume of the convex portion 112 and the concave portion 114 takes up most of the optical adapter 100. Therefore in order to absorb electromagnetic waves more efficiently, it is preferable that both the convex portion 112 and the concave portion 114 are formed of an electromagnetic wave absorption material. The ferrule core 104a may be formed of an electromagnetic wave absorption material.

It is preferable that the electromagnetic absorption material is a resin containing an additive which has electromagnetic absorption properties. In this case, the housing 102 or ferrule 104 having an electromagnetic absorption function can be provided at low cost by an additive contained in the resin which can be easily processed. It is preferable that the resin is used as a main material. Examples of this resin are polyamide resin, PBT (polybutyleneterephthalate) resin, PPS (polyphenylenesulfide) resin, LCP (liquid crystal polyester) resin and PEEK (polyetheretherketones) resin and epoxy resin. If a polyamide resin, PBT resin, PPS resin, LCP resin or PEEK resin, in particular, is used for the resin, and the housing 102 or ferrule 104 having an electromagnetic wave absorption function can be provided at low cost by injection molding.

For the additive, iron fine powder, aluminum fine powder, cobalt fine powder, silicon fine powder, iron oxide fine powder, carbon fine powder or stainless fine powder can be used. Fine powder of an alloy comprised of two or more materials out of iron, aluminum, cobalt and silicon can also be used as the additive. These additives can absorb electromagnetic waves by converting electromagnetic waves into heat.

It is preferable that the electromagnetic wave absorption material absorbs electromagnetic waves of which frequency is 1 GHz or more and 50 GHz or less. In this case, the radiating noise from the optical communication module can be effectively suppressed.

According to the optical adapter 100 of the present embodiment, once the first edge 102a of the housing 102 is inserted into the receptacle 22, electromagnetic waves emitted from the opening sections 22a and 22b of the receptacle 22 are absorbed by the electromagnetic wave absorption material of the housing 102 or the ferrule 104 of the optical adapter 100. Therefore the electromagnetic waves from the optical communication module 20 can be suppressed. Since the electromagnetic waves from the optical communication module 20 are absorbed by the optical adapter 100, and the induced emission of electromagnetic waves is suppressed even if a metal component is included inside the optical connector plug 30.

The present invention is not limited to the above mentioned embodiment, but can be modified in various ways.

According to the present invention, an optical adapter which can suppress electromagnetic waves from an optical communication module can be provided.

What is claimed is:

1. An optical adapter, comprising:
a housing having a first edge to be inserted into a receptacle of an optical communication module, and a second edge for insertion of an optical connector plug;

an optical fiber which is housed in said housing, and comprises a first edge to optically couple with said receptacle and a second edge to optically couple with said optical connector plug; and
a ferrule which is housed in said housing and houses said optical fiber, wherein
at least a part of said housing is formed of electromagnetic wave absorption material, and
said electromagnetic wave absorption material is formed of a resin containing an additive which has electromagnetic wave absorbing properties.

2. The optical adapter according to claim 1, wherein said additive is a fine powder of iron, iron oxide, carbon or stainless.

3. The optical adapter according to claim 1, wherein said additive is a fine powder comprising two or more materials from among iron, aluminum, cobalt and silicon.

4. The optical adapter according to claim 1, wherein said resin is a polyamide resin, PBT resin, PPS resin, LCP resin or PEEK resin.

* * * * *